A. S. GRANT.
FOCUSING DEVICE FOR CAMERAS.
APPLICATION FILED SEPT. 14, 1909.
983,047.
Patented Jan. 31, 1911.
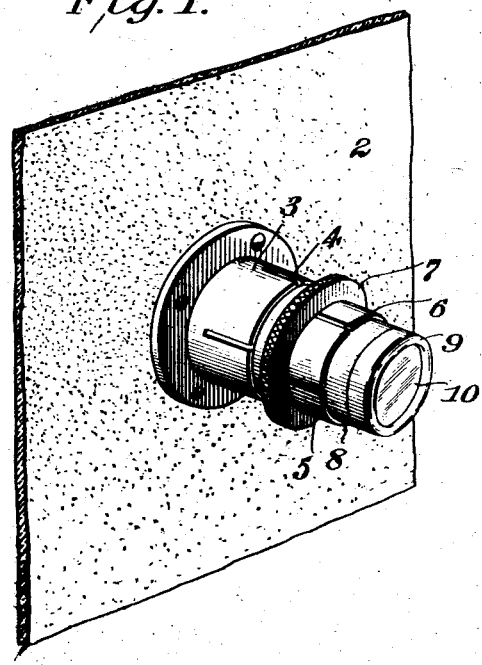
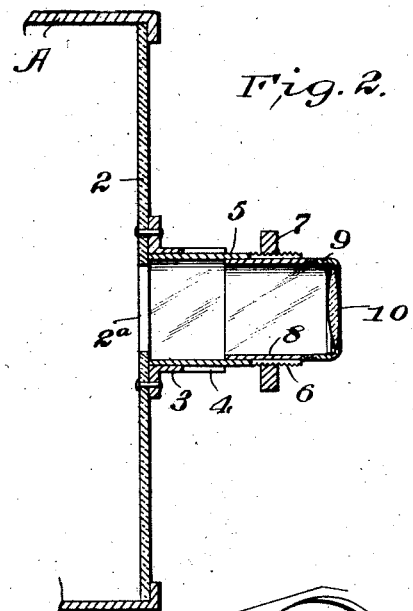
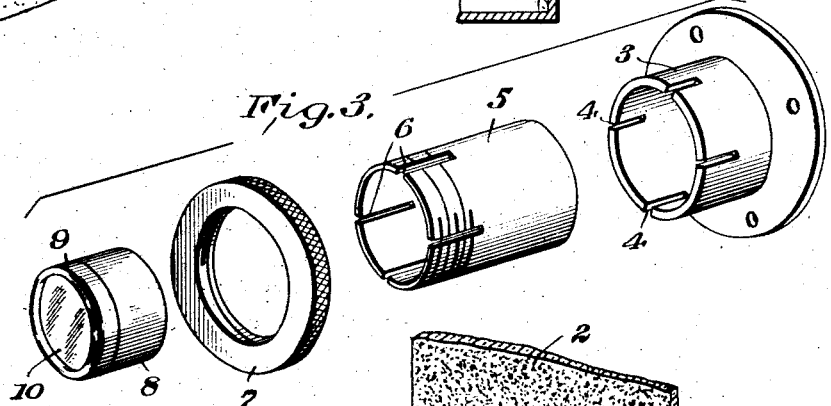
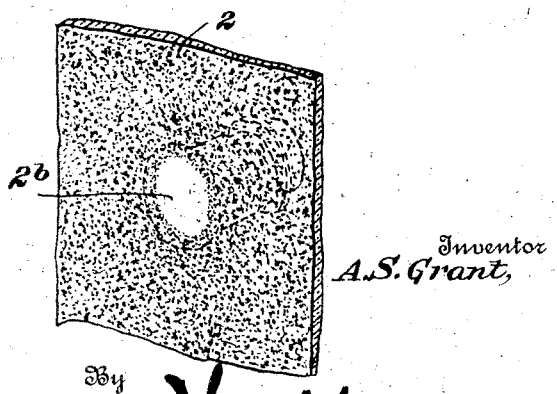
Inventor
A. S. Grant,
Witnesses
By
Attorneys

UNITED STATES PATENT OFFICE.

ADOLPHUS S. GRANT, OF HOUSTON, TEXAS.

FOCUSING DEVICE FOR CAMERAS.

983,047.  Specification of Letters Patent.  Patented Jan. 31, 1911.

Application filed September 14, 1909. Serial No. 517,660.

*To all whom it may concern:*

Be it known that I, ADOLPHUS S. GRANT, a citizen of the United States, residing at Houston, in the county of Harris and State of Texas, have invented certain new and useful Improvements in Focusing Devices for Cameras, of which the following is a specification.

My invention relates to means for accurately focusing photographic cameras, and particularly to a means for magnifying the image received from the objective upon the ground glass which forms the back of the camera.

In photographic cameras, the objective lens forms a reduced image which is thrown upon a plate of ground glass through which ground glass the image is observed, so that the camera may be properly directed and focused. The ground glass very materially reduces the brilliance of the image and renders accurate focusing difficult, except under the most favorable conditions of light. Focusing is of the highest importance in photography, and under normal conditions, one of the most difficult operations. On dark days, or with interiors and imperfectly lighted subjects, accurate focusing is next to impossible, besides being a tedious operation.

The object of my invention is to do away with these difficulties and provide a means whereby focusing may be accomplished in a few seconds and with entire precision.

Broadly considered, my invention resides in the use of a magnifying lens so adjusted that its focal plane coincides with the inner surface of the ground glass or screen and magnifies the image formed by the objective lens of the camera, the ground glass being either provided with an unground section at this point, or being cut away. The magnifying lens is mounted in a tube which is adjustable toward or from the ground glass, and which is adapted to be set in its adjusted position so as to prevent accidental movement of the lens, the device, however, as a whole, being adapted to be removed from the ground glass when desired.

For a full understanding of the invention and the merits thereof, and to acquire a knowledge of the details of construction, reference is to be had to the following description and accompanying drawing, in which:

Figure 1 is a perspective view showing my device applied to the ground glass of a photographic camera; Fig. 2 is a transverse section of the rear end of the camera and of the focusing device; Fig. 3 is a perspective view showing the parts of the focusing device disassembled; and, Fig. 4 is a perspective view looking toward the inner face of the ground glass and showing a transparent section in the ground glass.

Corresponding and like parts are referred to in the following description and indicated in all the views of the drawing by the same reference characters.

Referring to these figures, A designates the back of a camera, and 2 the ground glass thereof, upon which the image from the objective is received, as is usual in photographic cameras.

3 designates a cylindrical socket, split at its margin as at 4, the socket, at its inner end having a flange so as to be solidly attached to the rear face of the ground glass 2. This attachment may be made in any desirable manner.

5 designates a split sleeve of an exterior diameter permitting the sleeve to slide snugly within the socket, so that the sleeve and the lens carried thereby may be easily removed entirely from the socket, or as easily forced into the socket. The outer margin of the split sleeve is screw-threaded upon its exterior and is also split at a plurality of points, as at 6. Operating upon the screw-threaded end of the sleeve is the clamp ring 7. As the clamp ring is turned inward upon the sleeve, it reduces the diameter of the outer end of the sleeve and will clamp it against an inner lens-holding tube 8 to such an extent that the tube 8 will be immovable within the sleeve until the clamp ring has been unscrewed. The lens-holding tube 8 is smooth upon its outer surface and snugly fits the interior of the sleeve 5 and frictionally engages therewith so that when the end of the sleeve is contracted by screwing up the clamp ring 7, the frictional engagement between the sleeve and the tube will be such as to prevent the tube being shifted in such sleeve. The outer extremity of the tube is screw-threaded for engagement with the lens mounting 9 carrying the magnifying lens 10. It will be seen that by loosening the clamp ring 7, the lens-carrying tube may be shifted longitudinally in the sleeve 5 so as to bring the lens 10 nearer to or farther from the ground glass, and thus the lens 10 may be accurately focused so that its focal plane accurately coincides with the inner face of the ground glass. When this focusing of the lens 10 has been accomplished, the ring 7 is screwed up until the tube 8 is firmly held within the sleeve. Thereafter, the lens is held in its adjusted position with relation to the sleeve so that when the sleeve is inserted within the socket 3 and pressed home against the outer surface of the ground glass, the lens 10 will be accurately focused upon a plane coincident with the inner face of the ground glass. A section of the ground glass coinciding with the field of the lens 10 is to be cut away, as in Fig. 2, leaving the opening 2$^a$, or else the glass at this point is to be left unground, or if originally ground, is to be polished down so that this section of the glass is transparent, as indicated at 2$^b$, Fig. 4. Forming the glass, however, with a hole 2$^a$ through it is preferable to making a transparent section in the glass, for the reason that the image is thereby magnified directly, with nothing intervening to cause reflections or distortions. With the glass immediately under the magnifying lens 10 removed or left perfectly transparent, the image alone is magnified without the enormous loss of light incidental to the light from the objective passing through the ground face of the glass.

With my device, the principal point or object in the desired picture is brought into sharp focus, the operator of course looking through the magnifying glass and seeing the magnified image of this object. After the camera has been properly focused so that the image seen through the magnifying glass 10 is perfectly clear, the picture is to be arranged as desired on the ground glass by shifting the camera or object, as usual. With my device, the usual focusing cloth with which the operator is compelled to cover his head in order to observe the faint and indefinite image formed upon the ground glass, is done away with.

While I have shown what I believe to be the best form of my invention, I do not wish to be limited to this, as it is obvious that it might be embodied in other forms, without in any way departing from the spirit of the invention.

Having thus described the invention, what I claim is:—

1. The combination with the ground glass of a photographic camera having a transparent section at one point, of a magnifying lens mounted on the outer face of said ground glass opposite to the transparent section, and means whereby the lens may be adjusted nearer to or farther from the plane of the inner face of the ground glass.

2. The combination with the ground glass of a photographic camera having a transparent portion at one point, of a socket attached to the outer face of the ground glass, a lens tube carrying a magnifying lens at its end, and adjustable in the socket to bring the lens nearer to or farther from the plane of the inner face of the ground glass, and means for clamping the lens tube and the lens in their adjusted positions, said lens tube registering with the transparent portion of the ground glass.

3. The combination with the ground glass of a photographic camera, of a magnifying lens supported near to the rear face of the ground glass and adjustable to bring its focal plane into coincidence with the plane of the inner face of the ground glass, the glass opposite said magnifying lens being so formed as to permit the free passage of the image through the glass at that point.

4. The combination with the ground glass of a photographic camera, of a magnifying lens supported near the rear face of the ground glass and adjustable to bring its focal plane into coincidence with the plane of the inner face of the glass, the roughened surface of the ground glass being removed within the field of the lens to permit the free passage of the image through the glass.

5. The combination with the ground glass of a photographic camera, of a magnifying lens supported near the rear face of the ground glass and adjustable to bring its focal plane into coincidence with the inner face of the ground glass, the glass opposite to the lens and within the field thereof being formed to permit the free passage of the image through the glass at that point.

6. The combination with the ground glass of a photographic camera having a transparent section at one point, of a socket attached to the rear face of the glass and projecting out therefrom and surrounding the transparent section, a sleeve snugly fitting the interior of the socket and movable therein, the end of the sleeve being split and exteriorly screw threaded, a lens-carrying tube snugly fitting the interior of the sleeve, a magnifying lens carried on the end of the tube, said tube being movable in the sleeve to bring the focal plane of the magnifying lens into coincidence with the inner face of the ground glass, and a clamping ring engaging with the screw threaded end of the split sleeve to contract said end of the sleeve against the lens-carrying tube to hold the tube in any desired adjusted position.

7. The combination with the ground glass of a photographic camera having a portion thereof unground to permit the passage of an image through the glass, of a socket attached to the rear face of the ground glass and surrounding the section, a sleeve snugly fitting the interior of the socket and longitudinally movable therein into a position against the rear face of the ground glass, the exterior end of the sleeve being split, a lens-carrying tube snugly fitting the interior of the sleeve and carrying a magnifying lens at one end, said tube being longitudinally movable therein to bring the focal plane of the magnifying glass into coincidence with the plane of the inner face of the ground glass, and a screw threaded clamping ring fitting over the split end of the sleeve and engaged therewith and adapted to be turned so as to contract the split end of the sleeve upon the lens-carrying tube.

8. The combination with the ground glass screen of a photographic camera, one portion of said screen being transparent, of a magnifying lens mounted opposite to the transparent portion of the screen and arranged to focus at a point coincident with the plane of the inner face of said screen.

In testimony whereof I affix my signature in presence of two witnesses.

ADOLPHUS S. GRANT. [L. S.]

Witnesses:
SAML. E. PACKARD,
PEARL HUNTER.